US008567807B2

(12) United States Patent
Su

(10) Patent No.: US 8,567,807 B2
(45) Date of Patent: Oct. 29, 2013

(54) LOCKING ASSEMBLY FOR TOWING HITCH

(76) Inventor: Austin Su, Wilmington, CA (US)

( * ) Notice: Subject to any disclaimer, the term of this patent is extended or adjusted under 35 U.S.C. 154(b) by 35 days.

(21) Appl. No.: 13/243,101

(22) Filed: Sep. 23, 2011

(65) Prior Publication Data

US 2013/0076008 A1    Mar. 28, 2013

(51) Int. Cl.
*B60D 1/167* (2006.01)
(52) U.S. Cl.
USPC ............... 280/491.3; 280/491.1; 280/507; 280/494
(58) Field of Classification Search
USPC ............. 280/515, 504, 507, 494, 492, 491.1, 280/491.3
See application file for complete search history.

(56) References Cited

U.S. PATENT DOCUMENTS

| 3,281,162 | A | * | 10/1966 | Carson | 280/479.3 |
| 4,509,769 | A | * | 4/1985 | Weber | 280/491.1 |
| 5,224,960 | A | | 7/1993 | Duncan | |
| 5,232,240 | A | * | 8/1993 | Johnson | 280/491.5 |
| 5,516,140 | A | * | 5/1996 | Hinte | 280/494 |
| 5,647,604 | A | * | 7/1997 | Russell | 280/492 |
| 5,765,851 | A | * | 6/1998 | Parent | 280/491.4 |
| 5,873,595 | A | * | 2/1999 | Hinte | 280/504 |
| 6,502,847 | B1 | | 1/2003 | Greaves | |
| 6,612,604 | B2 | | 9/2003 | Greaves | |
| 6,619,686 | B1 | * | 9/2003 | Klar | 280/491.3 |
| 6,764,092 | B1 | | 7/2004 | Greaves, Jr. | |
| 6,991,247 | B1 | | 1/2006 | Hahne et al. | |
| 7,032,919 | B1 | | 4/2006 | Hahne et al. | |
| D544,412 | S | | 6/2007 | Roeber | |
| 7,837,216 | B1 | * | 11/2010 | Greaves et al. | 280/491.4 |
| 7,988,179 | B1 | * | 8/2011 | Goodman et al. | 280/491.4 |

* cited by examiner

*Primary Examiner* — Kevin Hurley
*Assistant Examiner* — Michael Stabley
(74) *Attorney, Agent, or Firm* — Fulwider Patton LLP

(57) ABSTRACT

The present invention is a locking assembly and tow bar that allows for one handed locking and unlocking of the tow bar and can be easily manipulated with one person. The tow bar has a receiver joint connecting the ends of two tow bar arms, the receiver joint including upper and lower plates. The receiver joint is connected by a coupling link to a clevis hitch, which has a horizontally mounted pivot bolt mounted for rotation about a horizontal axis. The tow bar rotates at the receiver joint about the pivot pin from a horizontal, or deployed position, to a vertical, or stowed position. The clevis hitch is received by a tow bar receiver, which in turn is disposed in a hitch socket on the towing vehicle.

4 Claims, 4 Drawing Sheets

LOCKING ASSEMBLY FOR TOWING HITCH

BACKGROUND

This application relates generally to trailer hitches, and more particularly to a trailer hitch that can lock quickly and reliably in the stow away position, and can be released from its locked position with one hand to allow easy exchange between the locked and unlocked positions.

A tow bar is connected to a hitch to allow a towing vehicle to tow another vehicle behind it on the road. This practice is seen many times with trailer homes, where a car can be towed behind the motorhome and then used once the motorhome is at its destination. Tow bars are plentiful in type, depending on the specific use and requirements of the application. One of the most common types of tow bars is an A-frame type tow bar such as that made by Austin Manufacture Inc. These tow bars have a pair of legs that diverge from a pivot point and connect to the vehicle at spaced apart locations. The pivot point is connected to a receiver bar that fits into a specially designed fitting on the towing vehicle, which allows both clearance and maneuverability for the vehicle being towed.

Because it is common for the towed vehicle to be detached and reattached to the tow bar on long trips, the tow bar includes a stowed position and an engaged position. To stow the tow bar in the stowed position may require various steps depending upon the model and type of the two bar, but typically involves positioning the tow bar in a vertical position until a locking pin can be passed through a locking plate, whereupon the locking pin is then either rotated into a locked position or it may be secured with a lock and key to prevent accidental release of the tow bar while the towing vehicle is driving. This requires some strength and dexterity, particularly if there is only one person performing the operation, as they must hold the tow bar steady while trying to thread the locking pin through the holes and balance the tow bar. There is a need for a simpler and easier way to lock and unlock the tow bar in the stowed position.

SUMMARY OF THE INVENTION

The present invention is a locking assembly and tow bar that allows for one handed locking and unlocking of the tow bar and can be easily manipulated with one person. The tow bar has a receiver joint connecting the ends of two tow bar arms, the receiver joint including upper and lower plates. The receiver joint is connected by a coupling link to a clevis hitch, which has a horizontally mounted pivot bolt mounted for rotation about a horizontal axis. The tow bar rotates at the receiver joint about the pivot pin from a horizontal, or deployed position, to a vertical, or stowed position. The clevis hitch is received by a tow bar receiver, which in turn is disposed in a hitch socket on the towing vehicle.

To lock the tow bar in the vertical, stowed position, the upper plate of the receiver joint includes a capture notch. The notch can be a square depression formed by four walls that extend from the upper plate to define a cavity in the notch. The clevis hitch has mounted on it a spring actuated detent that is oriented in the vertical direction. The detent is preferably angled with a profile that has a horizontal lower surface and an inclined upper surface converging to an apex at a distal end. When a force is applied to the upper surface of the spring loaded detent, the detent is pushed into a housing against the force of a biasing spring. When the force is removed, the spring biases the detent back to an extend position outside of the housing. The detent can be connected to a handle that can manually position the detent in the extended or withdrawn position.

When the tow bar is rotated about the pivot pin, the upper plate of the receiver joint transitions from a horizontal position to a vertical position. The location of the detend is positioned so that it will make contact with the proximal wall of the capture notch just before the tow bar reaches the vertical position. When the proximal wall of the capture notch makes contact with the upper surface of the detent, it pushes the detent out of the way and into the housing against the bias of the spring. Once the proximal wall passes the detent, which occurs as the tow bar reaches the vertical position, the detent releases in the absence of the force and springs back to the extended position inside the notch. The horizontal lower surface of the detent engages the inner surface of the proximal wall of the capture notch, preventing the tow bar from rotating back to a vertical position. Thus, the tow bar is easily locked in the upright or stowed position without further having to insert a pin or locking mechanism, simply by rotating the tow bar vertically into the stowed position.

To release the tow bar, the handle that is connected to the detent can be slid within a slot, withdrawing the detent back into the housing. With the detent withdrawn, the tow bar is released and can be rotated back to the horizontal or deployed position where is its ready to connect to a vehicle for towing. These objects, and other features, are best understood with reference to the drawings and the description of the invention below.Text

DETAILED DESCRIPTION OF THE PREFERRED EMBODIMENTS

Figure 1:
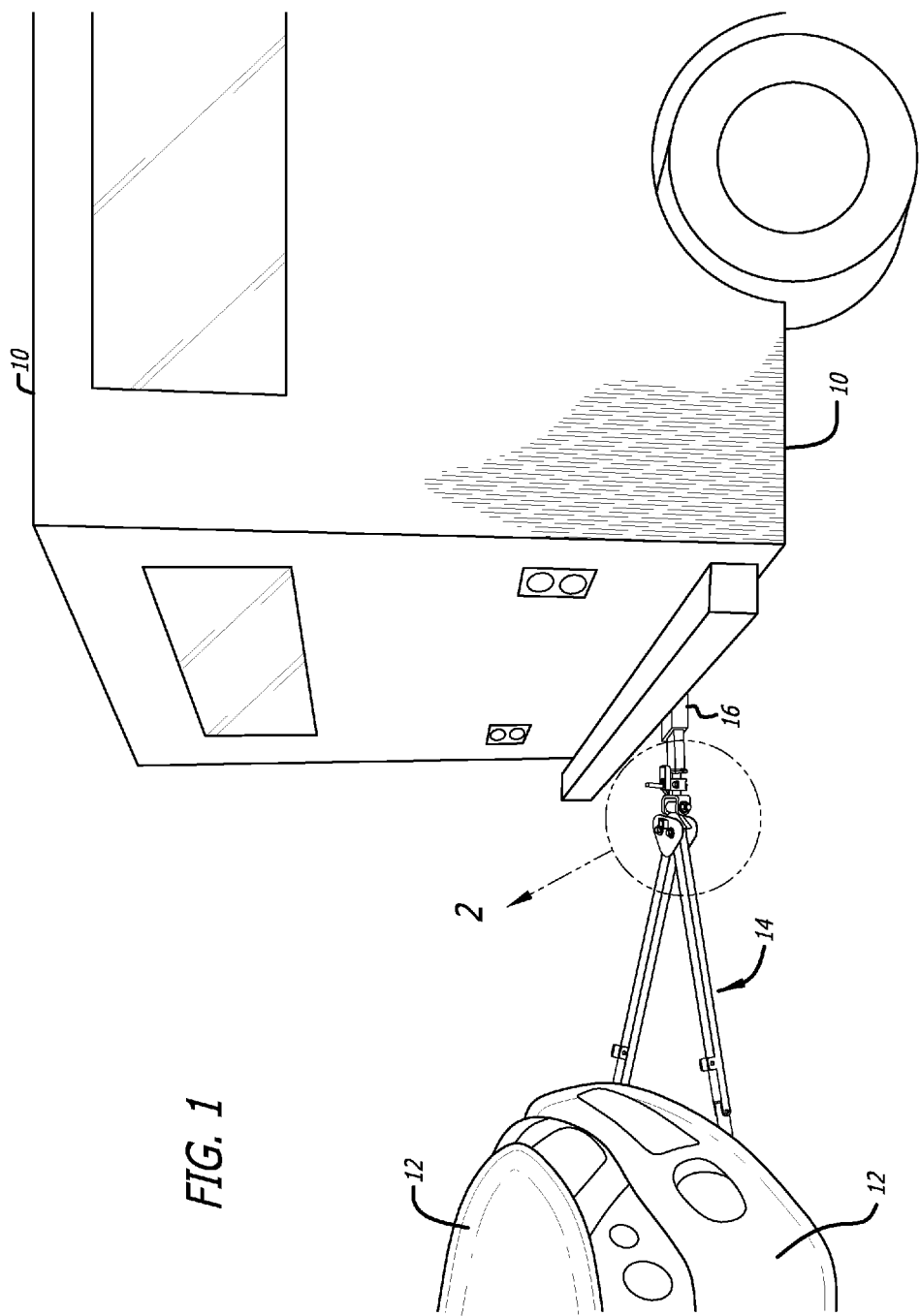
FIG. 1 is an elevated, perspective view of the tow bar and hitch assembly of the present invention.
Figure 2:
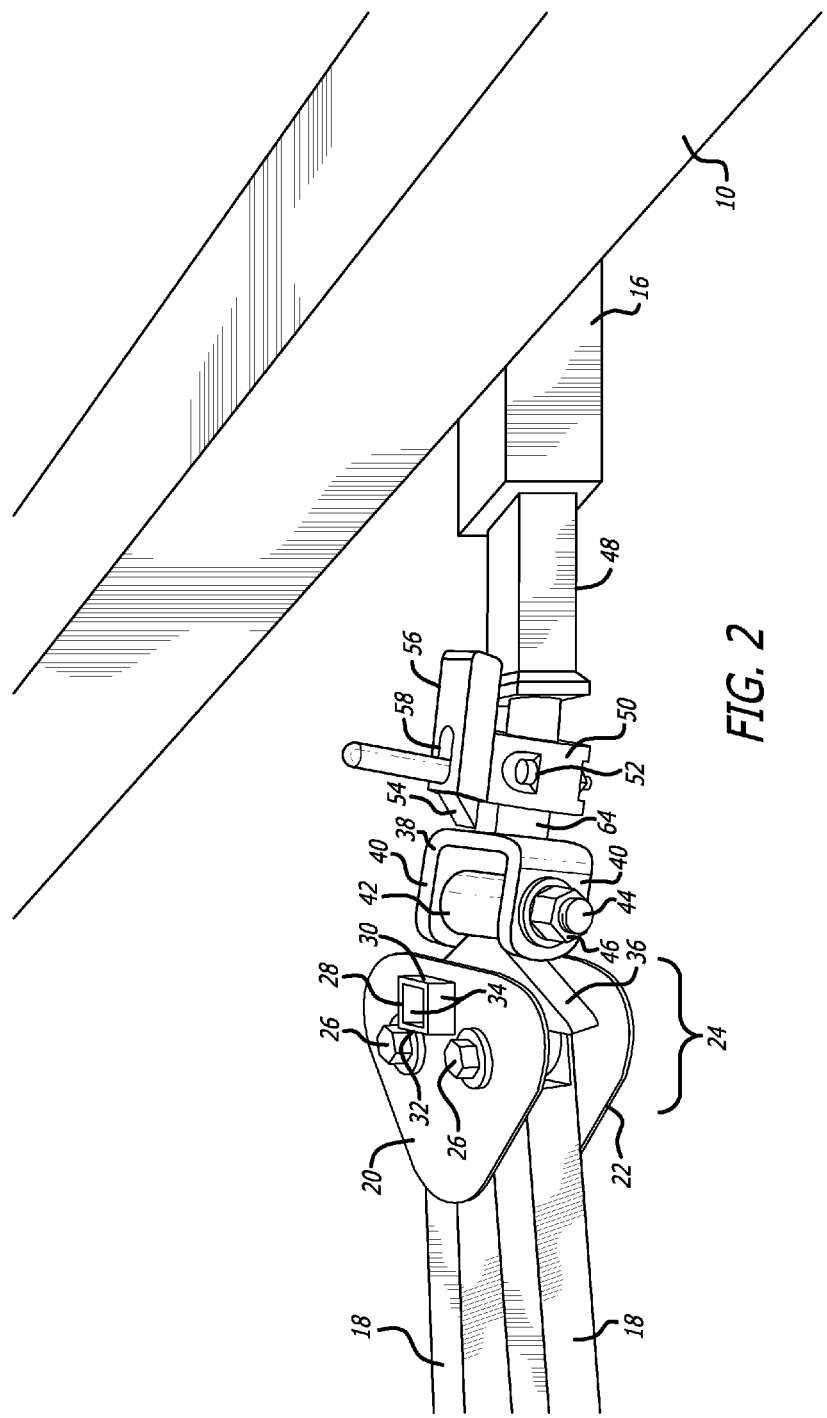
FIG. 2 is an enlarged perspective view of the assembly of FIG. 1.

FIG. 1 illustrates a preferred embodiment of the present invention wherein a tow bar assembly 14 connects a towing vehicle 10 to a towed vehicle 12. The tow bar assembly 14 is shown in greater detail in FIG. 2. FIG. 2 illustrates a pair of tow bar arms 18 that are connected to a receiver joint 24. The receiver joint has a bottom plate 22 and a top plate 20 that sandwiches the tow bar arms at a proximal end. A pair of bolts 26 pass through the top and bottom plates 20, 22 to secure the tow bar arms to the receiver joint 24. On the upper plate 20 is a capture notch 28 that is preferably formed by a proximal wall 30, a distal wall 32, and left and right side walls 34 forming a cavity therein. As will be explained more fully below, the capture notch 28 cooperates with a detent mechanism to form the locking connection for the tow bar assembly 14.

The receiver joint 24 is connected to a coupling link 36, which in turn is connected to a clevis hitch 38. The clevis hitch has parallel side walls 40 that are spaced apart and support a rotating collar 42. The collar 42 is mounted between the walls 40 by a bolt 44 and nut 46. The collar 42 is journaled on the bolt 44 so as to permit rotation about a horizontal axis. The clevis hitch 38 has a yoke 64 that is inserted into a tow bar receiver 48. The tow bar receiver 48 is, in turn, inserted into a hitch socket 16 on the towing vehicle 10. The tow bar receiver 48 and hitch socket 16 come in standard sizes and are well established in the industry.

On the yoke 64 is a clamp 50 having upper 51 and lower 53 halves connected by a pair of bolts 52. Mounted on the clamp 50 is a housing 56 that encloses a detent mechanism 54. The detent 54 slides within the housing 56 and has a flat horizontal lower surface 55 and an inclined distal upper surface 57 converging to a distal edge 59. The detent 54 is further connected to a handle 60 which slides within a slot 58, retracting and extending the detent mechanism 54 into and out of the housing 56. Within the housing is a spring 62 which biases the detent mechanism 54 out of the housing 56 and in an extended position (see FIG. 3). The detent mechanism 54 can be withdrawn into the housing 56 by applying a force on the upper surface 57 of the detent mechanism 54, as explained more fully below.

Figure 3:
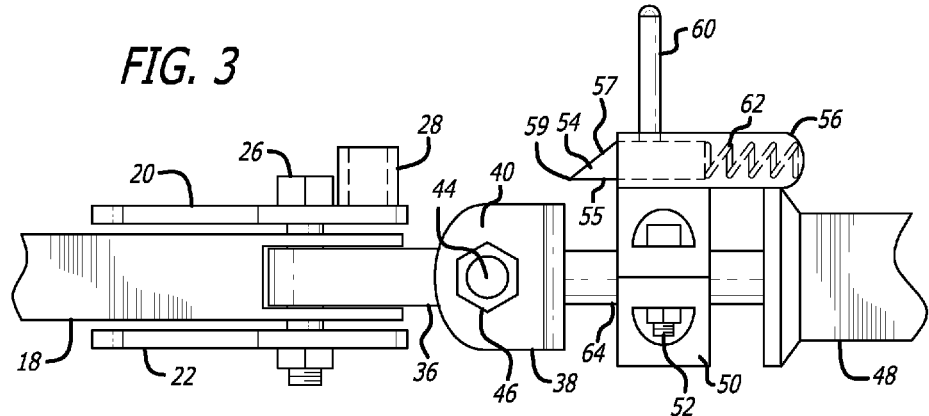
FIG. 3 is a further enlarged side view of the assembly of FIG. 1 with the tow bar in the deployed (horizontal) position.
Figure 4:
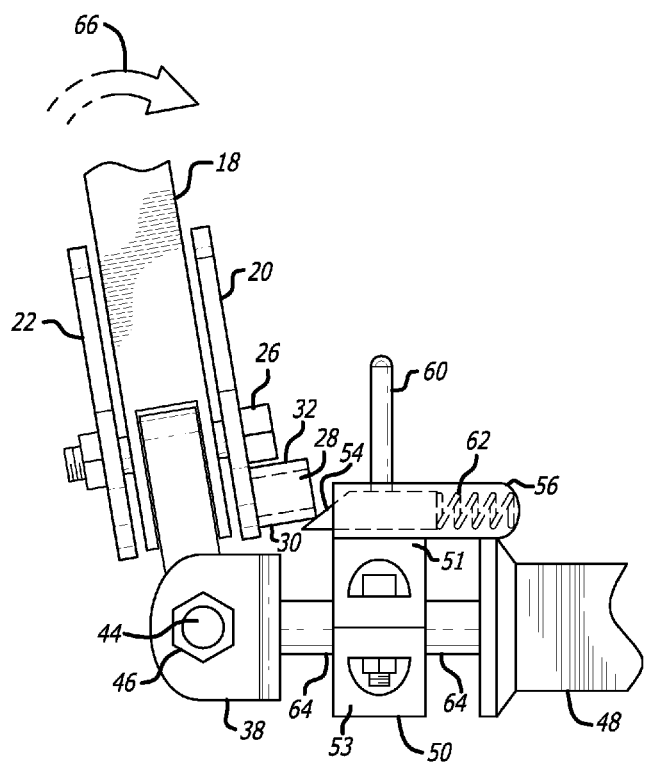
FIG. 4 is a side view of the assembly of FIG. 1 with the tow bar rotated to almost the stowed (vertical) position as the proximal wall of the capture notch contacts the detent of the locking assembly.
Figure 5:
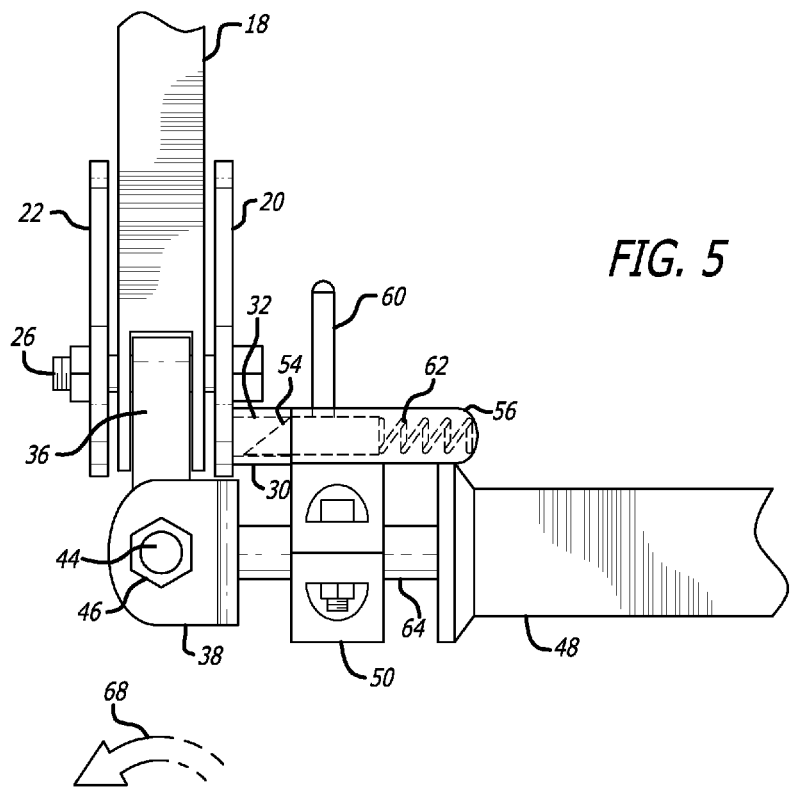
FIG. 5 is a side view of the assembly of FIG. 4, with the tow bar in the stowed position and the detent in the capture notch.

FIGS. 3-5 show the towing assembly as it is maneuvered from the deployed or horizontal position to a stowed or vertical position. The tow bar arms 18 and receiver joint 24 are raised (FIG. 4) to pivot the assembly about the clevis hitch 38, and more particularly about the collar 42. As the upper plate 20 and lower plate 22 approach the vertical position, the capture notch 28 at the proximal wall 30 makes contact with the upper surface 57 of the detent 54, as shown particularly in FIG. 4. Further rotation in the direction of arrow 66 by the tow bar assembly 14 causes the proximal wall 30 of the capture notch 28 to push the detent 54 into the housing 56 against the bias of the spring 62. Still further rotation of the tow bar assembly 14 causes the proximal wall 30 of the capture notch 28 to clear the detent 54, thereby relieving the force on the detent. With the opposing force no longer present, the spring 62 biases the detent 54 into the extended position occupying the cavity of the capture notch 28 as shown in FIG. 5. With the tow arms 18 and the receiver joint 24 in the fully vertical position, the presence of the detent 54 prevents the tow bar assembly 14 from rotating back into a horizontal position. More specifically, the lower horizontal surface 55 of the detent mechanism 54 blocks the capture notch's proximal wall 30 from movement in the counterclockwise direction. In this manner, the tow bar assembly 14 can be stowed in the vertical position simply by rotating it into the vertical orientation without inserting any pins or locking mechanism. This can be done with one hand, and can easily be accomplished by a single person.

Figure 6:
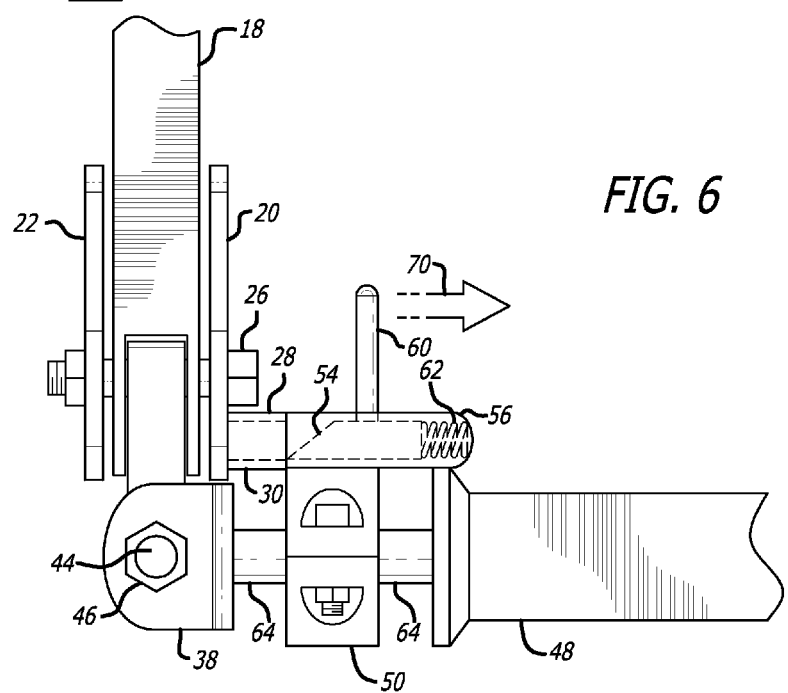
FIG. 6 is a side view of the assembly of FIG. 1, showing the handle withdrawing the detent into the housing so that the tow bar can be rotated back to the deployed position.

To release the tow bar assembly 14 from the blocking assembly, as shown in FIG. 6, the handle 60 can be slid within the slot 58 in the direction of arrow 70. This causes the detent 54 to withdraw in the housing 56, freeing the path of the capture notch 28. With the interference of the detent no longer present, the tow bar assembly 14 can be rotated in the direction of arrow 68 back to the deployed, or horizontal position, as shown in FIG. 3. Although the slot 58 and handle 60 are shown on the upper surface of the housing, they can also be employed on the side of the housing 56 if desired. As shown in FIGS. 5 and 6, the clamp 50 is positioned on the yoke 64 in such a way that the capture notch 28 will be flush with the housing 56 when the tow bar assembly 14 is in the vertical position. This mating of the housing 56 and capture notch 28 allows the interference of the detent 54 in the capture notch 28, preventing unwanted rotation.

The foregoing locking assembly provides reliable and simple locking of a tow bar assembly from a deployed or horizontal position to a stowed or vertical position, and further allows release of the assembly with a quick actuation of a handle.

While a preferred embodiment has been described herein, one of ordinary skill in the art will recognize that many variations are possible within the embodiments and descriptions made herein. For example, the shape of the detent and the capture notch can vary as long as they perform the functions described above. Other features, such as the connection of the tow bars to the receiver joint or the coupling of the tow bar receiver to the hitch socket, can vary without departing from the scope of the invention. Other alterations and modifications are intended to be within the scope of the present invention. Therefore, no restriction should be made on the scope of the invention based on the description and figures referenced above. Rather, the scope of the invention is intended to be governed by the appended claims, using their ordinary and customary meanings, in view of the foregoing descriptions.

I claim:

1. A locking tow hitch comprising:
   a pair of tow bar arms;
   a receiver joint connecting proximal ends of the pair of tow bar arms, the receiver joint including an upper plate and a lower plate and first and second fasteners securing said pair of tow bar arms between said upper and lower plates;
   a capture notch on the upper plate;
   a coupling link secured to the receiver joint;
   a tow bar receiver mountable in a towing vehicle hitch socket;
   a clevis hitch mounted in the tow bar receiver, the clevis hitch including a collar journalled on a pivot pin and connected to the coupling link;
   a self-locking spring-actuated detent having a horizontal lower surface and an angled upper surface converging at a first end and sized to be received in the capture notch when the tow bar arms are rotated to a vertical position about the clevis hitch, including a spring that biases the self-locking spring-actuated detent toward the capture notch; and
   a release mechanism for releasing the self-locking spring-actuated detent from the capture notch to allow the tow bar arms to return to a horizontal position by compressing the spring to withdraw the self-locking spring-actuated detent from the capture notch.

2. The locking tow hitch of claim 1, wherein the detent is located in a housing.

3. The locking tow hitch of claim 1 where the release mechanism is a handle connected to the self-locking spring-actuated detent.

4. The locking tow hitch of claim 3 where the handle is disposed in a housing and projects through a slot in a vertical orientation.

* * * * *